(12) United States Patent
Washburn et al.

(10) Patent No.: US 8,730,204 B2
(45) Date of Patent: May 20, 2014

(54) SYSTEMS AND METHODS FOR SIGNALING AND INTERFERENCE DETECTION IN SENSOR DEVICES

(75) Inventors: Clyde Washburn, Victor, NY (US); Eric Bohannon, Henrietta, NY (US); Imre Knausz, Fairport, NY (US); Kirk Hargreaves, Sunnyvale, CA (US)

(73) Assignee: Synaptics Incorporated, San Jose, CA (US)

( * ) Notice: Subject to any disclaimer, the term of this patent is extended or adjusted under 35 U.S.C. 154(b) by 245 days.

(21) Appl. No.: 13/233,781

(22) Filed: Sep. 15, 2011

(65) Prior Publication Data
US 2012/0068966 A1    Mar. 22, 2012

Related U.S. Application Data

(60) Provisional application No. 61/406,437, filed on Oct. 25, 2010, provisional application No. 61/383,655, filed on Sep. 16, 2010.

(51) Int. Cl.
*G06F 3/045*    (2006.01)

(52) U.S. Cl.
USPC ........................................ 345/174; 178/18.06

(58) Field of Classification Search
USPC .......... 345/173–178; 178/18.01, 18.03, 18.06
See application file for complete search history.

(56) References Cited

U.S. PATENT DOCUMENTS

| | | |
|---|---|---|
| 4,170,025 A | 10/1979 | Benkley et al. |
| 4,459,541 A | 7/1984 | Fielden et al. |
| 4,733,222 A | 3/1988 | Evans |
| 4,974,236 A | 11/1990 | Gurcan et al. |
| 5,304,937 A | 4/1994 | Meyer |
| 5,305,017 A | 4/1994 | Gerpheide |
| 5,648,642 A | 7/1997 | Miller |
| 5,666,113 A | 9/1997 | Logan |
| 5,787,126 A | 7/1998 | Itoh et al. |

(Continued)

FOREIGN PATENT DOCUMENTS

| | | |
|---|---|---|
| EP | 0749086 A1 | 12/1996 |
| EP | 1624399 A1 | 2/2006 |

(Continued)

OTHER PUBLICATIONS

Yam, Y.-O. et al. "Innovative Demodulation Method for SSB Technique" IEE Proc.-Circuits Devices Syst., vol. 146, No. 3, Jun. 1999.

(Continued)

*Primary Examiner* — Abbas Abdulselam
*Assistant Examiner* — Gerald Oliver
(74) *Attorney, Agent, or Firm* — Ingrassia Fisher & Lorenz P.C.

(57) ABSTRACT

An input device processing system comprises a sensor module that transmits a first transmitter signal with a transmitter electrode and receives a resulting signal with a receiver electrode. The first transmitter signal comprises a first transmitter frequency, and the resulting signal comprises effects corresponding to the first transmitter signal. A demodulation module demodulates the resulting signal to produce a first signal (e.g., an upper sideband signal) and a second signal (a lower sideband signal), selectably determines a first measurement of a change in capacitive coupling between the transmitter electrode and the receiver electrode based on at least one of the first and second signals, and determines positional information for an input object based on the first measurement.

20 Claims, 7 Drawing Sheets

(56) References Cited

U.S. PATENT DOCUMENTS

| | | | |
|---|---|---|---|
| 5,790,106 | A | 8/1998 | Hirano et al. |
| 5,825,352 | A | 10/1998 | Bisset et al. |
| 5,841,078 | A | 11/1998 | Miller |
| 5,861,875 | A | 1/1999 | Gerpheide |
| 5,880,411 | A | 3/1999 | Gillespie et al. |
| 5,917,906 | A | 6/1999 | Thornton |
| 5,940,526 | A | 8/1999 | Setlak et al. |
| 5,963,679 | A | 10/1999 | Setlak |
| 6,067,368 | A | 5/2000 | Setlak et al. |
| 6,259,804 | B1 | 7/2001 | Setlak et al. |
| 6,392,167 | B1 | 5/2002 | Nakagawa |
| 6,570,557 | B1 | 5/2003 | Westerman et al. |
| 6,621,487 | B2 | 9/2003 | Iwasaki et al. |
| 6,704,005 | B2 | 3/2004 | Kato et al. |
| 6,771,280 | B2 | 8/2004 | Fujisaki et al. |
| 6,788,288 | B2 | 9/2004 | Ano |
| 7,075,316 | B2 | 7/2006 | Umeda et al. |
| 7,106,720 | B2 | 9/2006 | Ozluturk et al. |
| 7,292,229 | B2 | 11/2007 | Morag et al. |
| 7,372,455 | B2 | 5/2008 | Perski et al. |
| 7,451,050 | B2 | 11/2008 | Hargreaves |
| 7,616,786 | B2 | 11/2009 | Setlak |
| 7,812,827 | B2 | 10/2010 | Hotelling et al. |
| 7,868,874 | B2 | 1/2011 | Reynolds |
| 8,338,724 | B2 | 12/2012 | Reynolds |
| 2002/0049070 | A1 | 4/2002 | Bick |
| 2002/0050983 | A1 | 5/2002 | Liu et al. |
| 2002/0173337 | A1* | 11/2002 | Hajimiri et al. ............... 455/552 |
| 2002/0185981 | A1 | 12/2002 | Dietz et al. |
| 2003/0030628 | A1 | 2/2003 | Sato et al. |
| 2003/0035570 | A1 | 2/2003 | Benkley, III |
| 2003/0067449 | A1 | 4/2003 | Yoshikawa et al. |
| 2003/0076306 | A1 | 4/2003 | Zadesky et al. |
| 2003/0133432 | A1 | 7/2003 | Moerder |
| 2004/0056785 | A1 | 3/2004 | Webster et al. |
| 2004/0056849 | A1 | 3/2004 | Lohbihler et al. |
| 2004/0081339 | A1 | 4/2004 | Benkley, III |
| 2005/0005703 | A1 | 1/2005 | Saito et al. |
| 2005/0024065 | A1 | 2/2005 | Umeda et al. |
| 2005/0052425 | A1 | 3/2005 | Zadesky et al. |
| 2005/0073324 | A1 | 4/2005 | Umeda et al. |
| 2005/0122785 | A1 | 6/2005 | Umeda et al. |
| 2005/0150697 | A1 | 7/2005 | Altman et al. |
| 2006/0293017 | A1* | 12/2006 | Kim et al. ............... 455/323 |
| 2007/0047669 | A1 | 3/2007 | Mak et al. |
| 2007/0062852 | A1 | 3/2007 | Zachut et al. |
| 2007/0109274 | A1* | 5/2007 | Reynolds ............... 345/173 |
| 2008/0158167 | A1 | 7/2008 | Hotelling et al. |
| 2008/0192018 | A1 | 8/2008 | Park et al. |
| 2009/0135973 | A1 | 5/2009 | He |
| 2009/0143031 | A1* | 6/2009 | Shah ............... 455/114.1 |
| 2009/0189867 | A1 | 7/2009 | Krah et al. |
| 2009/0273579 | A1 | 11/2009 | Zachut et al. |
| 2009/0322351 | A1 | 12/2009 | Mcleod |
| 2009/0322578 | A1 | 12/2009 | Petrovic |
| 2010/0059295 | A1 | 3/2010 | Hotelling |
| 2010/0060589 | A1 | 3/2010 | Wilson |
| 2010/0060591 | A1 | 3/2010 | Yousefpor et al. |
| 2010/0110037 | A1 | 5/2010 | Huang et al. |
| 2010/0159858 | A1 | 6/2010 | Dent et al. |
| 2010/0189197 | A1 | 7/2010 | Nakatani |
| 2010/0321331 | A1 | 12/2010 | Oda et al. |
| 2011/0037724 | A1 | 2/2011 | Paulsen et al. |
| 2011/0063993 | A1 | 3/2011 | Wilson et al. |
| 2011/0084857 | A1 | 4/2011 | Marino et al. |
| 2012/0056841 | A1 | 3/2012 | Krenik et al. |

FOREIGN PATENT DOCUMENTS

| | | | |
|---|---|---|---|
| KR | 20100042761 | A | 4/2010 |
| WO | 0247018 | A2 | 6/2002 |
| WO | 2004107146 | A2 | 12/2004 |

OTHER PUBLICATIONS

West, J.D.K. "The Application of the Asymmetric Polyphase Filter in an SSB Transceiver" Grinel Natal Branch of Grinaker Electronics, IEEE 1991.

Smith, et al.; "Code-Division Multiplexing of a Sensor Channel: A Software Implementation"; IEEE Journal; Apr. 1999; pp. 725-731; vol. 17, No. 4.

Cichocki, et al.; "A Switched-Capacitor Interface for Capacitive Sensors Based on Relaxation Oscillators"; IEEE Journal; Oct. 1990; pp. 797-799; vol. 39, No. 5.

Huang, et al; "Electronic Transducers for Industrial Measurement of Low Value Capacitances"; J. Phys. E: Sci. Instrum. 21 1988; pp. 242-250; IOP Publishing Printed in the U.K.

Philipp, Hal; "Charge Transfer Sensing", pp. 1-9; Copyright 1997.

Zimmerman, et al.; "Applying Electric Field Sensing to Human-Computer Interfaces", MIT Media Laboratory; pp. 1-8; to be published in (IEEE SIG) CHI May 1995.

Yamada, et al.; "A Switched-Capacitor Interface for Capacitive Pressure Sensors", IEEE Journal; Feb. 1992; pp. 81-86; vol. 41, No. 1.

Smith, et al.; "Electric Field Sensing for Graphical Interfaces"; IEEE Computer Graphics and Applications; May/Jun. 1998; pp. 54-60.

Vigoda, Benjamin; "A Nonlinear Dynamic System for Spread Spectrum Code Acquisition"; MIT Media Laboratory; pp. 10-90.

International Search Report for International Application No. PCT/US2006/040266, mailed Mar. 30, 2007.

Chinese Office Action 200680042701.5 dated May 25, 2011.

International Search Report for International Application No. PCT/US2011/051998, mailed Feb. 23, 2012.

Japan Patent Office "Notice of Reasons for Rejection" mailed Feb. 29, 2012 for Japanese Patent Application No. P2008-541174.

Chinese Office Action 200680042701.5 dated Sep. 14, 2011.

The International Bureau of WIPO, PCT International Preliminary Report on Patentability in PCT International Application No. PCT/US2011/051998, mailed Mar. 28, 2013.

International Searching Authority, PCT Written Opinion of the International Searching Authority in PCT International Application No. PCT/US2011/051998, mailed Feb. 23, 2012.

USPTO, Ex parte Quayle Office Action for U.S. Appl. No. 13/679,355, mailed Apr. 5, 2013.

USPTO, Office Action for U.S. Appl. No. 13/161,267, mailed Apr. 4, 2013.

USPTO, Notice of Allowance and Fee(s) Due for U.S. Appl. No. 13/679,355, mailed Jun. 11, 2013.

United States Patent and Trademark Office, Office Action for U.S. Appl. No. 12/962,096, dated Jun. 19, 2012.

United States Patent and Trademark Office, Notice of Allowance for U.S. Appl. No. 12/962,110, dated Jul. 16, 2012.

United States Patent and Trademark Office, U.S. Notice of Allowance dated Aug. 20, 2012 for U.S. Appl. No. 12/962,096.

United States Patent and Trademark Office, U.S. Office Action mailed Aug. 15, 2013 for U.S. Appl. No. 13/233,790.

USPTO, Final Office Action in U.S. Appl. No. 13/161,267, mailed Sep. 10, 2013.

* cited by examiner

SYSTEMS AND METHODS FOR SIGNALING AND INTERFERENCE DETECTION IN SENSOR DEVICES

CROSS-REFERENCES TO RELATED APPLICATIONS

This application claims priority to U.S. Prov. Pat. App. No. 61/383,655, filed Sep. 16, 2010, and U.S. Prov. Pat. App. No. 61/406,437, filed Oct. 25, 2010, both of which are incorporated by reference herein.

FIELD OF THE INVENTION

This invention generally relates to electronic devices, and more specifically relates to sensor devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers).

Proximity sensor devices may typically incorporate either profile capacitive sensors or capacitive image sensors. Capacitive profile sensors alternate between multiple axes (e.g., x and y), while capacitive image sensors scan multiple transmitter rows to produce a more detailed capacitive "image" of "pixels" associated with an input object. While capacitive image sensors are advantageous in a number of respects, such sensors may be susceptible to various types of interference. Accordingly, there is a need for improved sensor systems and methods for detecting and avoiding various such interference.

BRIEF SUMMARY OF THE INVENTION

A processing system for an input device in accordance with one embodiment of the invention includes a sensor module comprising sensor circuitry, the sensor module configured to transmit a first transmitter signal with a transmitter electrode and receive a resulting signal with a receiver electrode, wherein the first transmitter signal comprises a first transmitter frequency, and the resulting signal comprises effects corresponding to the first transmitter signal. A demodulation module is configured to demodulate the resulting signal to produce first and second output signals, the demodulation module comprising: a first mixing stage comprising a first mixing frequency and a second mixing frequency; and a second mixing stage comprising a third mixing frequency and a fourth mixing frequency; wherein the third mixing frequency is a combination of the first mixing frequency and the first transmitter frequency; wherein the demodulation module is configured to determine a first measurement of a change of capacitive coupling between the transmitter electrode and the receiver electrode based on the first output signal, and to determine positional information for an input object based on the first measurement.

A capacitive sensor device in accordance with one embodiment comprises a transmitter electrode, a receiver electrode, and a processing system. The processing system is communicatively coupled to the transmitter electrode and the receiver electrode, the processing system comprising a first mixing stage comprising a first mixing frequency and a second mixing frequency, and a second mixing stage comprising a third mixing frequency and a fourth mixing frequency, wherein the third mixing frequency is a combination of the first mixing frequency and the first transmitter frequency, the fourth mixing frequency is in quadrature with the third mixing signal, and the second mixing frequency is in quadrature with the first mixing signal. The processing system is configured to transmit a first transmitter signal with the transmitter electrode and receive a resulting signal with the receiver electrode, wherein the first transmitter signal comprises a first transmitter frequency, and the resulting signal comprises effects corresponding to the first transmitter signal; demodulate the resulting signal to produce first and second output signals; and determine a first measurement of a change of capacitive coupling between the transmitter electrode and the receiver electrode based on the first output signal, and to determine positional information for an input object based on the first measurement.

A method in accordance with one embodiment of the invention comprises: transmitting a first transmitter signal with a transmitter electrode, the first transmitter signal comprising a first transmitter frequency; receiving a resulting signal with a receiver electrode, the resulting signal comprising effects corresponding to the first transmitter signal; demodulating the resulting signal to produce a first output signal and a second output signal by mixing the resulting signal with a first mixing stage and a second mixing stage, wherein the first mixing stage comprises a first mixing frequency and a second mixing frequency and the second mixing stage comprises a third mixing frequency and a fourth mixing frequency, and wherein the third mixing frequency corresponds to the absolute value of the difference between the first mixing frequency and the first transmitter frequency; determining a first measurement of a change of capacitive coupling between the transmitter electrode and the receiver electrode based on the first output signal; and determining positional information for an input object based on the first measurement.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
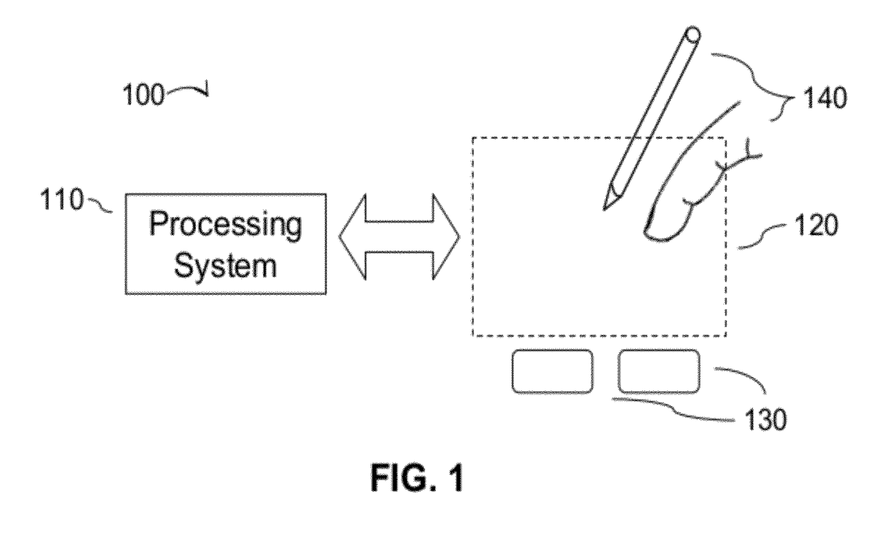
FIG. 1 is a block diagram of an exemplary system that includes an input device in accordance with an embodiment of the invention.

Various embodiments of the present invention provide input devices and methods that facilitate improved usability. FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Figure 2:
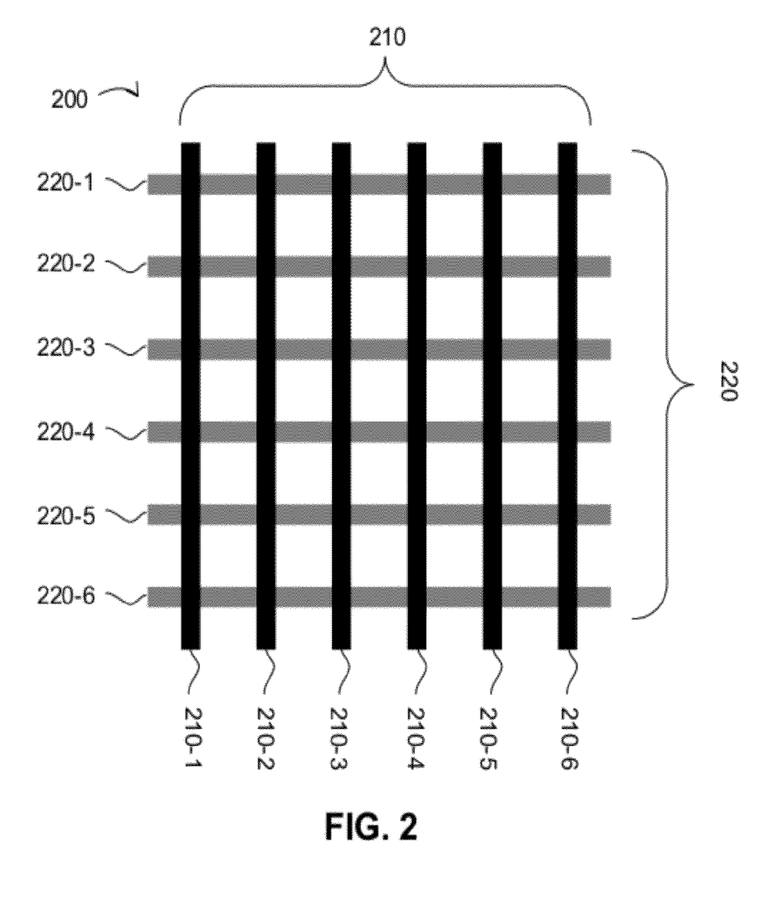
FIG. 2 is a block diagram of sensor electrodes in accordance with an exemplary embodiment of the invention.

In this regard, FIG. 2 illustrates, conceptually, an exemplary set of capacitive sensor electrodes 200 configured to sense in a sensing region. For clarity of illustration and description, FIG. 2 shows a pattern of simple rectangles; however, it will be appreciated that the invention is not so limited, and that a variety of electrode patterns may be suitable in any particular embodiment. In one embodiment, sensor electrodes 210 are configured as receiver electrodes and sensor electrodes 220 are configured as transmitter electrodes. In other embodiments, sensor electrodes 210 are configured to sense input object position and/or motion in the X direction and sensor electrodes 220 are configured to sense input object position and/or motion in the Y direction.

Sensor electrodes 210 and 220 are typically ohmically isolated from each other. That is, one or more insulators separate sensor electrodes 210 and 220 and prevent them from electrically shorting to each other. In some embodiments, sensor electrodes 210 and 220 are separated by insulative material disposed between them at cross-over areas; in such constructions, the sensor electrodes 210 and/or sensor electrodes 220 may be formed with jumpers connecting different portions of the same electrode. In some embodiments, sensor electrodes 210 and 220 are separated by one or more layers of insulative material. In some other embodiments, sensor electrodes 210 and 220 are separated by one or more substrates; for example, they may be disposed on opposite sides of the same substrate, or on different substrates that are laminated together. The capacitive coupling between the transmitter electrodes and receiver electrodes change with the proximity and motion of input objects in the sensing region associated with the transmitter electrodes and receiver electrodes.

In some embodiments, the sensor pattern is "scanned" to determine these capacitive couplings. That is, the transmitter electrodes are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, as described in further detail below, multiple transmitter electrodes may transmit different transmitter signals according to one or more coding schemes that enable their combined effects on the resulting signals of receiver electrodes to be independently determined.

The receiver sensor electrodes may be operated singly or multiply to acquire resulting signals. The resulting signals may be used to determine measurements of the capacitive couplings. A set of measured values from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Referring again to FIG. 1, a processing system 110 is shown as part of the input device 100. The processing system 110 is configured to operate the hardware of the input device 100 (including, for example, the various sensor electrodes 200 of FIG. 2) to detect input in the sensing region 120. The processing system 110 comprises parts of or all of one or more integrated circuits (ICs) and/or other circuitry components. For example, as described in further detail below, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes a determination module configured to determine positional information for an input device based on the measurement.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 3:
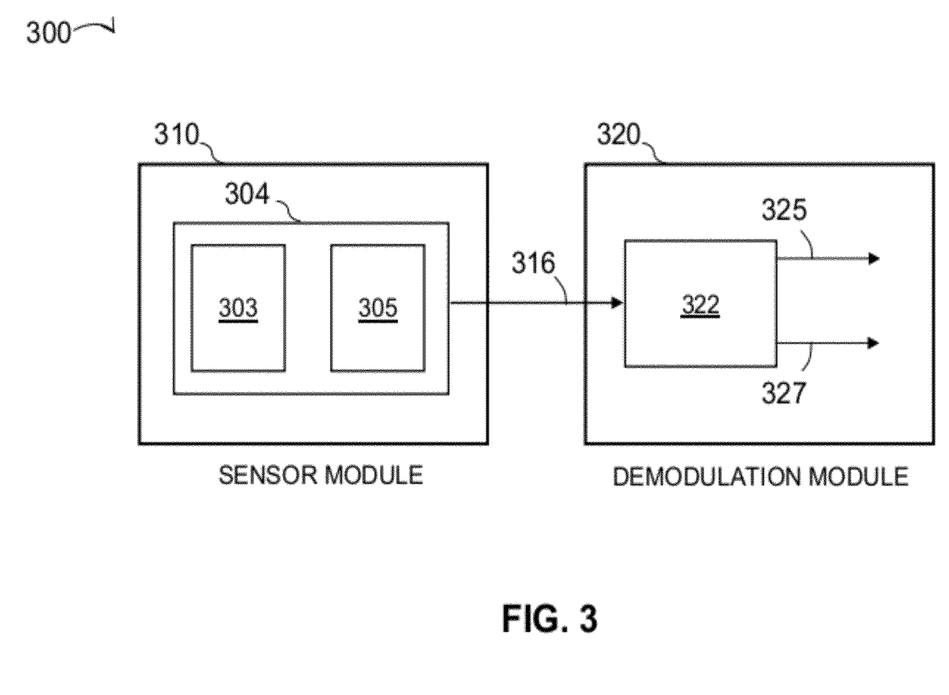
FIG. 3 is a conceptual block diagram depicting an exemplary embodiment of the invention.

Referring now to the conceptual block diagram depicted in FIG. 3, one embodiment of an exemplary processing system 110 as shown in FIG. 1 may include a system 300. System 300, as illustrated, generally includes sensor module 310 communicatively coupled via a set of sensor electrodes (or simply "electrodes") 304, to demodulation module 320. Sensor Electrodes 304 include one or more transmitter electrodes 303 and one or more receiver electrodes 305. In one embodiment, for example, transmitter electrodes 303 and receiver electrodes 305 are implemented as described above in connection with FIG. 2.

Sensor module 310 includes any combination of hardware and/or software configured to transmit transmitter signals with transmitter electrodes 303 and receive one or more resulting signals with receiver electrodes 305. The transmitter signals may comprise any one of a sinusoidal waveform, square waveform, triangular waveform, sawtooth waveform or the like. In one embodiment, the frequency of each transmitter signal comprises a transmitter frequency ($f_{ts}$), and the resulting signal 316 comprises effects corresponding to the first transmitter signal.

In the illustrated embodiment, demodulation module 320 includes any combination of hardware and/or software (illustrated generally as block 322) configured to demodulate the resulting signal 316 to produce signal 325 and signal 327. In various embodiments, signal 325 is an upper sideband signal (USB signal) and signal 327 is a lower sideband signal (LSB signal). In another embodiment, signal 325 is a first output signal and signal 327 is a second output signal. Demodulation module is further configured to selectably determine a measurement of a change in capacitive coupling between a transmitter electrode of transmitter electrodes 303 and a receiver electrode of receiver electrodes 305 based on at least one of signal 325 and signal 327. In one embodiment, demodulation module is further configured to selectably determine a first measurement of a change in capacitive coupling between a transmitter electrode of transmitter electrodes 303 and the receiver electrode 305 based on at least one of a USB signal and a LSB signal. In another embodiment, demodulation module is further configured to determine a first measurement of a change in capacitive coupling between a transmitter electrode of transmitter electrodes 303 and a receiver electrode of receiver electrodes 305 based on a first output signal or a second output signal. Demodulation module 320 is configured to then determine positional information for an input object (e.g., input object 140 in FIG. 1) based on the first measurement.

In various embodiments, the measurement of change in capacitive coupling is determined based on one of the signals (e.g., signal 325 or signal 327), while a measure of interference is determined based on the other signal. The interference may include internal and external interference sources, such as, but not limited to, power supplies, display devices, light sources, electronic components, thermal, etc. In other embodiments the first measurement is determined based on the first output signal, while a measure of interference is determined based on the second output signal For example, in one embodiment, the measure of interference is determined based on a lower sideband signal when the first measurement is determined based on the upper sideband signal, and the measure of interference is determined based on an upper sideband signal when the first measurement is determined based on lower sideband signal. In various embodiments, the measure of interference may be based on a peak to peak amplitude measurement, frequency or bandwidth measurement, power spectral density measurement, volts squared per hertz or the like.

In accordance with one embodiment, sensor module 310 is configured to transmit a second transmitter signal, different from the first transmitter signal, based on the measure of interference. That is, sensor module 310 may selectably transmit a particular transmitter signal when the measure of interference meets some predetermined criterion. For example, in one embodiment, sensor module 310 may transmit the second transmitter signal when it determines that the amplitude of the measure of interference is below a predetermined threshold. In another embodiment, sensor module 310 may transmit the second transmitter signal when it determines that the amplitude of the measure of interference is below or meets a predetermined threshold. In yet other embodiments, sensor module 310 may shift from transmitting the first or second transmitter signal to transmitting a third transmitter signal based on a measure of interference of at least one of signal 325 or signal 327. In one embodiment, sensor module 310 may transmit a third transmitter signal based on a measure of interference of both signal 325 and signal 327. In one embodiment, if any AC information is found to be in the signal used to determine the measurement (either signal 325 or signal 327), then it can be determined that the signal (at that frequency) has interferers. However, if a transmitter signal is found to have substantially only DC output with no significant AC information, that transmitter signal can be determined to be substantially "clean". In a further embodiment, if a transmitter signal is found to have substantially no DC output with no significant AC information, that transmitter signal can be determined to be substantially "clean".

In one embodiment, demodulation module 320 is configured to demodulate resulting signal 316 to produce upper sideband signal 325 and lower sideband signal 327 by mixing resulting signal 316 with a harmonic rejection mixer. That is, block 322 may comprise a harmonic rejection mixer comprising any suitable combination of hardware and software capable of inserting nulls at harmonic frequencies to suppress unwanted responses. As will be described in more detail below, in various embodiments, a harmonic rejection mixer comprises a multi-level mixing signal. Block 322 may implement a variety of other methods for producing signal 325 and 327, including without limitation Weaver modulation, Hartley modulation, Bandpass filtering, image reject filtering and the like.

Figure 4:
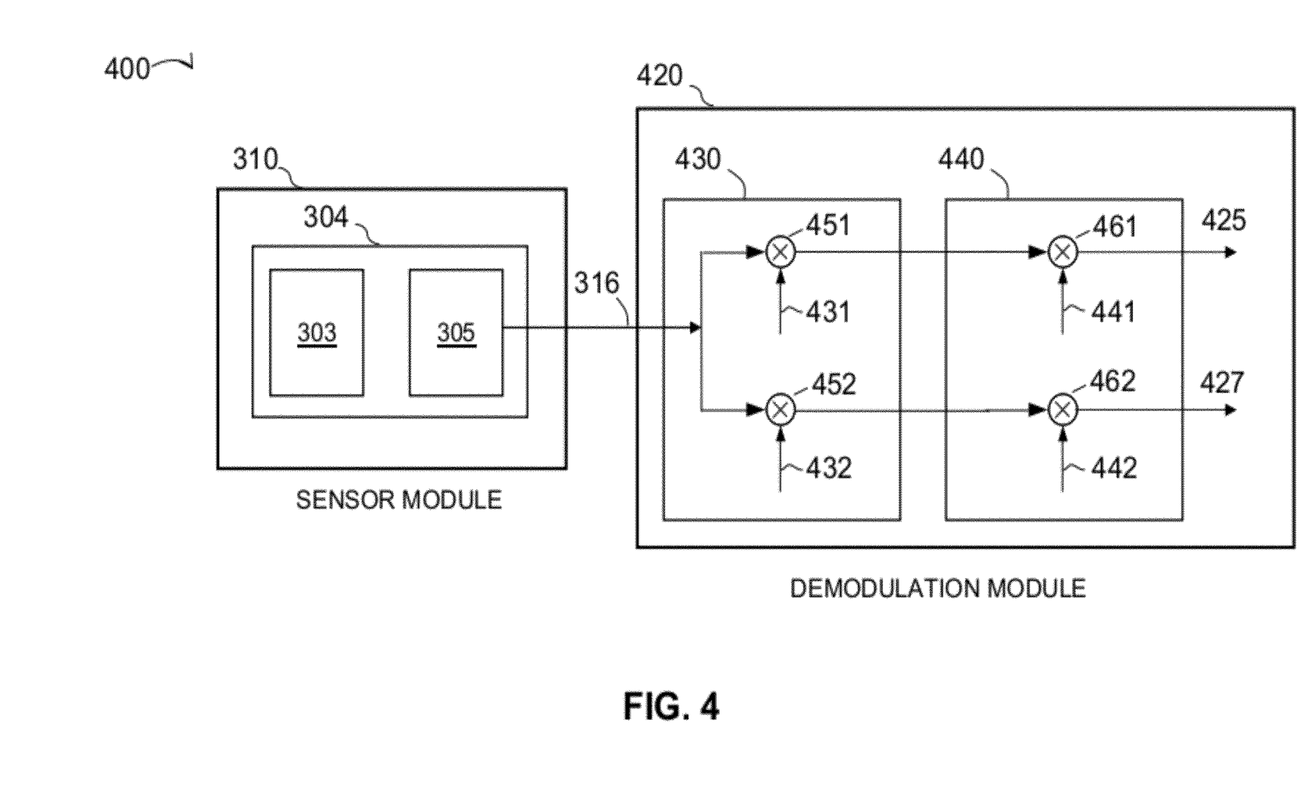
FIG. 4 is a conceptual block diagram depicting an exemplary embodiment of the invention.

FIG. 4 is a schematic diagram of exemplary demodulation module circuitry (or simply "circuitry") 400 suitable for use in block 322 of demodulation module 320 of the embodiment depicted in FIG. 3. As shown, demodulation module 420 is configured to demodulate resulting signal 316 by mixing resulting signal 316 with two mixing stages (mixing stage 430 and mixing stage 440) to produce two outputs: signal 425 and signal 427. In one embodiment, signal 425 may be referred to as first output signal and signal 427 may be referred to as second output signal. In other embodiments, signal 425 may be referred to as an upper side-band (USB) signal and signal 427 may be referred to as a lower side-band (LSB) signal. Mixing stage 430 comprises a first mixing frequency 431 and a second mixing frequency 432 corresponding to respective mixers 451 and 452. Similarly, mixing stage 440 comprises a third mixing frequency 441 and a fourth mixing frequency 442 corresponding to respective mixers 461 and 462. Demodulation module 420 is configured to determine a measurement of a change of capacitive coupling between a transmitter electrode of transmitter electrodes 303 and a receiver electrode of receiver electrodes 305 based on at least one of signal 425 and 427. In various embodiments, demodulation module 420 is configured to determine a first measurement of a change of capacitive coupling between a transmitter electrode of transmitter electrodes 303 and a receiver electrode of receiver electrodes 305 based on at least one of a USB signal and a LSB signal. In some embodiments, demodulation module 420 is configured to determine a first measurement of a change of capacitive coupling between a transmitter electrode of transmitter electrodes 303 and a receiver electrode of receiver electrodes 305 based on a first output signal. Further, demodulation module 420 may be configured to determine positional information for an input object based on the first measurement.

In accordance with one embodiment, the third mixing frequency 441 corresponds to both the first mixing frequency 431 and the first transmitter frequency. In the illustrated embodiment, mixing stages 430 and 440 are implemented in series; however, the invention is not so limited. In a further embodiment, as described in further detail below, the third mixing frequency 441 is a combination of the first mixing frequency 431 and the first transmitter frequency such that the third mixing frequency 441 corresponds to the absolute value of the difference between the first mixing frequency 431 and the first transmitter signal.

In one embodiment, the fourth mixing frequency 442 is in quadrature with the third mixing frequency 441, and the second mixing frequency 432 is in quadrature with the first mixing frequency 431. That is, first mixing frequency 431 is 90 degrees out of phase with respect to second mixing frequency 432, and third mixing frequency 441 is 90 degrees out of phase with respect to fourth mixing frequency 442.

In one embodiment, while signal 425 is used to determine the first measurement of a change of capacitive coupling between a transmitter electrode of transmitter electrodes 303 and a receiver electrode of receiver electrodes 305, a measure of interference is determined based on signal 427. This measure of interference may be used for a variety of purposes. For example, sensor module 310 may be configured to transmit a second transmitter signal, different from the first transmitter signal, based on this measure of interference. In this regard, sensor module 310 may have any number of candidate transmitter signals having a variety of frequencies and phases. In one embodiment, when sensor module 310 transmits a second transmitter signal, different from the first transmitter signal, based on the measure of interference, sensor module 310 does not continue to transmit the first transmitter signal. In various embodiments, the interference of a third transmitter signal may be determined changing the first mixing frequency and correspondingly the third mixing frequency. For example, the first mixing frequency may be increased or decreased such that the difference between the transmitter signal frequency and the third mixing signal stays substantially constant. In such embodiments, the frequency of the transmitted transmitter signal does not substantially change; however, the interference of a third transmitter signal can be measured.

Figure 5A:
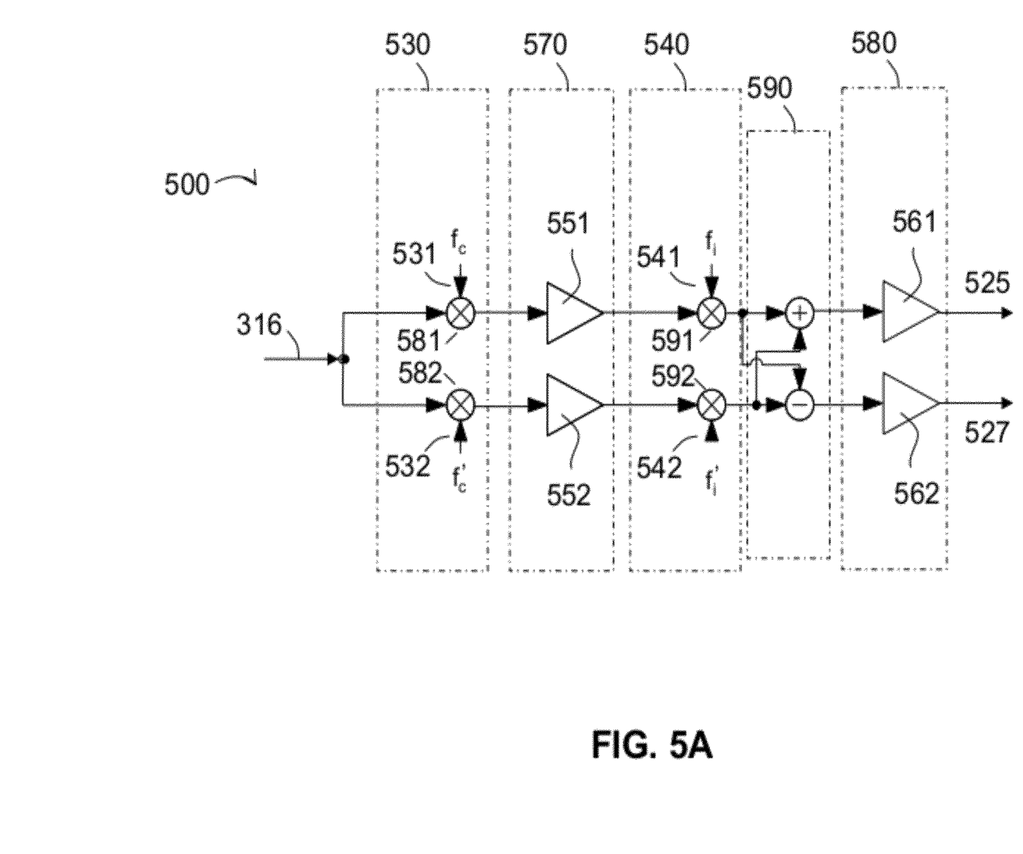
FIG. 5A is a schematic diagram of demodulation module circuitry in accordance with one embodiment of the invention.

FIG. 5A is a schematic diagram of exemplary demodulation module circuitry (or simply "circuitry") 500 suitable for use in block 322 of demodulation module 320 of the embodiment depicted in FIG. 3. In such an embodiment, signal 525 and signal 527 of FIG. 5A suitably correspond to signal 325 and signal 327 of FIG. 3. Furthermore, circuitry 500 is suitable for use as one implementation of mixing stages 430 and 440 of FIG. 4. In such an embodiment, signal 525 and signal 527 of FIG. 5A suitably correspond to signal 425 and signal 427. In one embodiment signal 525 may be referred to as USB signal and signal 527 may be referred to as LSB signal. In other embodiments, signal 525 and signal 527 may be referred to as first and second output signals. In this regard, it will be appreciated that FIG. 5A provides a simplified schematic, and that practical embodiments may include additional circuit components. For example, additional filters and mixers may be incorporated into circuitry 500, and/or the illustrated circuit components may be arranged in a variety of topologies.

In the illustrated embodiment, signal 525 and signal 527 are produced by mixing resulting signal 316 with two mixing stages: mixing stage 530 (the "first" mixing stage) and mixing stage 540 (the "second" mixing stage). Mixing stage 530 comprises a first mixing frequency 531 and a second mixing frequency 532 corresponding to respective mixers 581 and 582. Similarly, mixing stage 540 comprises a third mixing frequency 541 and a fourth mixing frequency 542 corresponding to respective mixers 591 and 592. In accordance with one embodiment, the third mixing frequency 541 corresponds to the first mixing frequency 531 and the first transmitter frequency 532. In various embodiments, mixing frequencies 541 and 542 of second stage 540 are a function of one or more of the mixing frequencies 531 and 532 of first mixing stage 530 and the first transmitter frequency. In one embodiment, for example, the third mixing frequency 541 corresponds to the absolute value of the difference between the first mixing frequency 531 and the first transmitter frequency, and fourth mixing frequency 542 is in quadrature with third mixing frequency 541. The various illustrated mixing frequencies 531, 532, 541, and 542 may be sinusoidal, square, triangular, or any other suitable wave shape, including a three-level (or more) waveform, as described in further detail below.

In one embodiment, the second mixing frequency 532 is in quadrature with the first mixing frequency 531. Thus, mixing frequency 531 is designated as $f_c$, and mixing frequency is designated as $f_c'$, indicating that the two signals are in quadrature with each other. Similarly, fourth mixing frequency 542 ($f_i'$) is in quadrature with the third mixing frequency 541 ($f_i$). As shown, each output of mixing stage 540 is ultimately summed with the inverse of the other output. This summation produces at least one signal that can be used in determining a measure of the capacitive coupling between transmitter and receiver electrodes. In one embodiment, at least one of the signals produced by the summation is an uncorrelated signal (i.e., a signal with no DC component).

In various embodiments, the measurement of a change of capacitive coupling may be determined using either signal 525 or signal 527. In some embodiments, signal 525 and signal 527 may be referred to as USB and LSB signals. In one embodiment, for example, the first measurement is determined based on signal 525 when the transmitter signal frequency (of sensor module 310 in FIG. 3) is greater than the first mixing frequency 531 (i.e., $f_c<f_{ts}$). In such an embodiment, signal 525 may be referred to as an USB signal. In another embodiment, the first measurement is determined based on signal 527 when the transmitter signal frequency (of sensor module 310 in FIG. 3) is less than the first mixing frequency 531 (i.e., $f_{ts}<f_c$. In such an embodiment, signal 527 may be referred to as a LSB.

In various embodiments, circuitry 500 includes one or more filter stages. In the illustrated embodiment, for example, circuitry 500 includes a filter stage 570 and a filter stage 580. Filter stage 570 includes filters 551 and 552, while filter stage 580 includes filters 561 and 562. As shown, filter stage 570 is coupled to first mixing stage 530, and filter stage 580 is coupled to second mixing stage 540 via the summation stage 590. While filter stage 580 is illustrated as following summation stage 590, in various embodiments, filter stage 580 may occur between second mixing stage 540 and summation stage 590. In one embodiment, when filter stage follows summation stage 590, filter 561 and 562 may be configured to perform signal processing, such as integration, analog to digital conversion or the like. In various embodiments, filter stage 570 and 580 may comprise a variety of filter types including low pass filters, band pass filters or the like.

In this way, it can be seen that in one embodiment, resulting signal 316 of FIG. 5A is first mixed in mixing stage 530 against sine and cosine versions of a carrier frequency ($f_c$), yielding sine and cosine versions of the offset frequency. The resulting signals (from mixing stage 530) may then be low-pass filtered by filter stage 570 to remove mixing components that are significantly above the desired quadrature products. The second set of mixers of mixing stage 540 operate on these signals based on the sine and cosine of the modulation frequency ($f_i$), producing (through filter stage 580) an output 525 and an output 527 in a band centered at the modulation offset frequency, such that one of the sidebands (output 525 or output 527) is centered at DC.

Figure 5B:
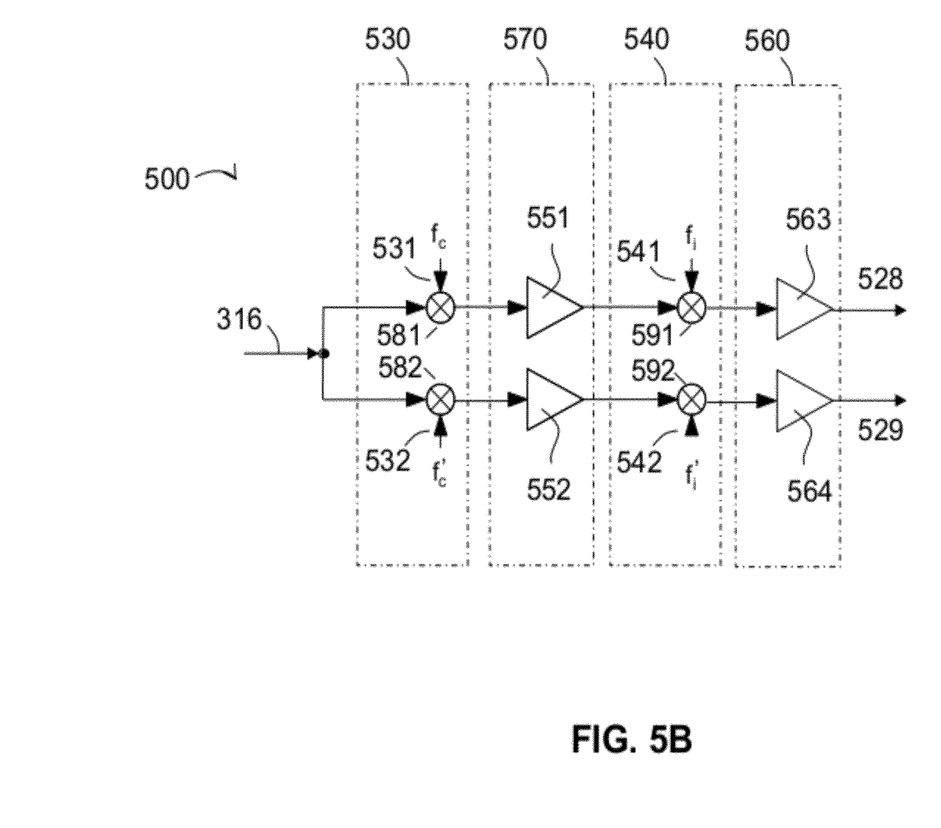
FIG. 5B is a schematic diagram of demodulation module circuitry in accordance with one embodiment of the invention.

In the embodiment of FIG. 5B, an alternative to the embodiment of FIG. 5A is shown. In such an embodiment, first filter stage 570 is coupled to first mixing stage 530. A variety of filter types may be incorporated into first filter stage 570. In one embodiment, one or more of the filters in filter stage 570 are image reject filters. The image reject filter may comprise a complex filter, an asymmetric polyphase filter, a real filter or the like. Filter stage 570 may be configured to substantially attenuate predetermined frequencies, while not substantially attenuating other frequencies. For example, filter 551 may be configured to attenuate a first frequency, passing through a second frequency while filter 552 may be configured to attenuate the second frequency while passing through the first frequency. In one embodiment, the first frequency may be a positive frequency and the second frequency may be a negative frequency. In other embodiments, filter 551 and 552 may pass and attenuate unrelated frequencies. Further, filter 551 and filter 552 may be dynamically configured to attenuate and pass different frequency. In one embodiment, filter 551 and filter 552 are dynamically configured to attenuate and pass different frequency based on the relationship between the transmitter signal frequency and the first mixer frequency.

As shown in FIG. 5B, in various embodiments, when first filter stage 570 comprises at least one image reject filter, a summation stage may not be included. As such, the signals 528 and 529 correspond to signals 525 and 527, and perform similarly. As is known in the art, a complex filter is "complex" in the sense that it is not a "real" filter—e.g., there is no complex conjugate symmetry of the poles in its pole zero map. A complex filter is also not symmetrical around DC, and is able to segregate positive frequencies from negative frequencies. In most cases, a complex filter has two inputs that are already in quadrature, and two outputs that are in quadrature. Like a complex filter, an asymmetric polyphase filter may be configured to substantially attenuate predetermined frequencies, however an asymmetric polyphase filter takes a single input and produces two outputs that are 90 degrees apart (an I and Q).

In various embodiments, first filter stage 570 may comprise a single filter. In such embodiments, the filter may be configured to attenuate and pass frequencies based on the relationship between the transmitter signal frequency and the first mixer frequency. In one embodiment, the filter is dynamically configured to attenuate and pass different frequency based on the relationship between the transmitter signal frequency and the first mixer frequency. For example, when the transmitter signal frequency is less than the first mixer frequency, the filter may be configured to perform in a lower sideband mode and when the transmitter signal frequency is greater than the first mixer frequency, the filter may be configured to perform in an upper sideband mode.

Figure 6:
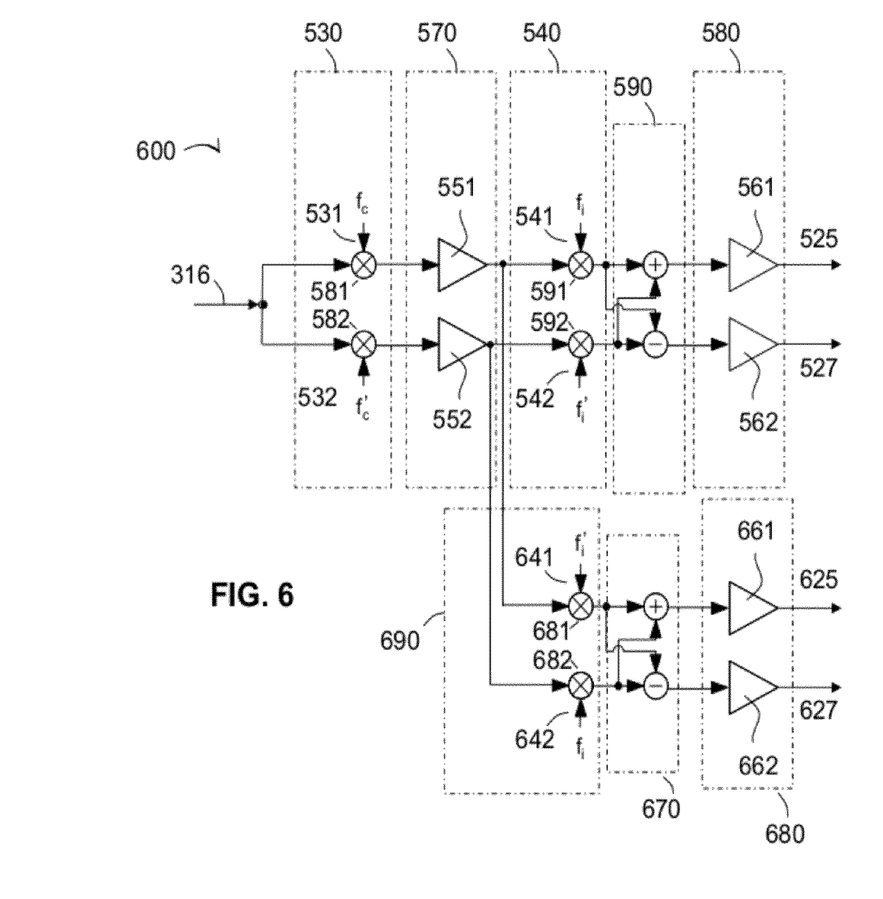
FIG. 6 is a schematic diagram of demodulation module circuitry in accordance with another embodiment of the invention.

Referring now to FIG. 6, in an alternate embodiment, the demodulation module includes circuitry 600 configured to demodulate a resulting signal to produce a quadrature signal 625 and quadrature signal 627, where quadrature signal 625 is in quadrature with signal 525 and quadrature signal 627 is in quadrature with signal 527. In one embodiment, quadrature signal 625 corresponds to an upper sideband quadrature signal and quadrature signal 627 corresponds to a lower sideband quadrature signal, when signal 525 corresponds to USB signal and signal 527 corresponds to LSB signal. In other embodiments, quadrature signal 625 corresponds to a first quadrature signal and quadrature signal 627 corresponds to a second quadrature signal, when signal 525 corresponds to a first output signal and when signal 527 corresponds to a second output signal. That is, with respect to circuitry 500 of FIG. 5A, circuitry 600 includes an additional, third mixing stage 690 that comprises a fifth mixing frequency 641 ($f_i$') and a sixth mixing frequency 642 ($f_i$) corresponding to respective mixers 641 and 642. In accordance with this embodiment, demodulation modules 320 and 420 are further configured to determine interference via one or more of the quadrature signal 625 and quadrature signal 627.

Filters 661 and 662 may be any filter as discussed with reference to FIG. 5A above. Further, as was discussed with reference to FIG. 5A, second filter stage 580 of FIG. 6 may precede summation stage 590 of FIG. 6. In one embodiment, filter stage 680 precedes summation stage 670. In various embodiments, as discussed above with reference to FIG. 5B, first filter stage 570 comprises image reject filters (or filter). In such embodiments, with reference to the above discussion related to FIG. 5B summation stage 590 and the summation stage 670 may not be included.

Referring again to FIG. 5A, in accordance with one embodiment, demodulation module 520 is configured to simultaneously determine a first measurement of the change in capacitive coupling between a transmitter electrode of transmitter electrodes 303 and a receiver electrode of receiver electrodes 305 based on signal 525, and determine a second measurement of the change in the capacitive coupling based on signal 527. In such an embodiment, the transmitter signal frequency corresponds to the first mixing frequency and third mixing frequency. Further, the transmitter signal may be described as comprising two frequencies components, where a first frequency component mixes to signal 525 and a second frequency component mixes to signal 527. In other embodiments, the frequency components of the transmitter signal mix to an USB signal and to a LSB signal. The measurements may then be used by processing system 110 to determine positional information for an input object. Because two different measurements are available, the system may determine the positional information based on whichever signal is substantially "clean" of interference. The interference in each signal can be determined using any known method. In one embodiment, the two signals can be compared to each other to determine the substantially "clean" signal. In further embodiments, the signals can be compared to a baseline value or values to determine the substantially "clean" signal. In one embodiment, if both the upper side-band and lower side-band signals are determined to comprise interference, either the carrier signal frequency or the modulation signal frequency may be shifted. In another embodiment, if both the signals are determined to comprise interference, both the carrier signal frequency and the modulation signal frequency may be shifted.

Mixing signals, such as those illustrated in FIGS. 5A, 5B, and 6, may take a variety of forms. For example, a particular mixing signal may be a square waveform, a sinusoidal waveform, a triangular waveform, a sawtooth waveform or the like. In one embodiment, one or more mixing signals have a multi-level square waveform. Such a mixer may be referred to as a type of harmonic rejection mixer. A three-level mixer waveform may substantially suppress any effects due to a third harmonic. In other embodiments, the mixing signal is not limited to having three levels and may exhibit more than three levels. In one embodiment, a five-level mixer waveform may be used to substantially suppress any effects due to third and fifth harmonics of the transmitter signal. In other embodiments, further multi-level mixing waveforms may be used to substantially suppress further harmonics of the transmitter signal. Multi-level mixing waveforms may reduce harmonic sensitivities of the demodulation module 320. Furthermore, the illustrated mixers may be combined—e.g., by combining two mixers in a single low impedance-to-differential stage folded to two mixing commutators.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system for an input device, the processing system comprising:
   a sensor module comprising sensor circuitry, the sensor module configured to transmit a first transmitter signal with a transmitter electrode and receive a resulting signal with a receiver electrode, wherein the first transmitter signal comprises a first transmitter frequency, and the resulting signal comprises effects corresponding to the first transmitter signal; and
   a demodulation module configured to demodulate the resulting signal to produce first and second output signals, the demodulation module comprising:
   a first mixing stage comprising a first mixing frequency and a second mixing frequency; and
   a second mixing stage in series with the first mixing stage and comprising a third mixing frequency and a fourth mixing frequency;
   wherein the third mixing frequency is a combination of the first mixing frequency and the first transmitter frequency; and
   wherein the demodulation module is configured to determine a first measurement of a change of capacitive coupling between the transmitter electrode and the receiver electrode based on the first output signal, and to determine positional information for an input object based on the first measurement.

2. The processing system of claim 1, wherein a measure of interference is determined based on the second output signal.

3. The processing system of claim 2, wherein the sensor module is configured to transmit a second transmitter signal, different from the first transmitter signal, based on the measure of interference.

4. The processing system of claim 1, wherein the fourth mixing frequency is in quadrature with the third mixing signal, and the second mixing frequency is in quadrature with the first mixing signal.

5. The processing system of claim 1, wherein the third mixing frequency is a combination of the first mixing frequency and the first transmitter frequency such that the third mixing frequency corresponds to the absolute value of the difference between the first mixing frequency and the first transmitter signal.

6. The processing system of claim 1, wherein the first mixing stage comprises a harmonic rejection mixer.

7. The processing system of claim 1, wherein the demodulation module further comprises a first filter stage coupled to the first mixing stage and a second filter stage coupled to the second mixing stage.

8. The processing system of claim 7, wherein the first filter stage comprises an image reject filter.

9. The processing system of claim 1, wherein:
the demodulation module further comprises a third mixing stage comprising a fifth mixing frequency and a sixth mixing frequency, wherein the fifth mixing frequency is in quadrature with third mixing frequency, and the sixth mixing frequency is in quadrature with the fourth mixing frequency;
the demodulation module is further configured to demodulate the resulting signal to produce a first quadrature signal and a second quadrature signal, wherein the first quadrature signal is in quadrature with the first output signal, and the second quadrature signal is in quadrature with the second output signal; and
the demodulation module is further configured to determine interference of the first quadrature signal and interference of the second quadrature signal.

10. The processing system of claim 9, wherein sensor module is configured to transmit a second transmitter signal, different from the first transmitter signal, based on at least one of the interference of the first quadrature signal and the interference of the second quadrature signal.

11. The processing system of claim 1, wherein the demodulation module is further configured to determine a second measurement of a change in capacitive coupling between the transmitter electrode and the receiver electrode based on the second output signal, and wherein positional information for an input object is further based on the second measurement.

12. A capacitive sensor device comprising:
a transmitter electrode;
a receiver electrode; and
a processing system communicatively coupled to the transmitter electrode and the receiver electrode, the processing system comprising a first mixing stage comprising a first mixing frequency and a second mixing frequency, and a second mixing stage in series with the first mixing stage and comprising a third mixing frequency and a fourth mixing frequency, wherein the third mixing frequency is a combination of the first mixing frequency and the first transmitter frequency, the fourth mixing frequency is in quadrature with the third mixing signal, and the second mixing frequency is in quadrature with the first mixing signal;
wherein the processing system is configured to:
transmit a first transmitter signal with the transmitter electrode and receive a resulting signal with the receiver electrode, wherein the first transmitter signal comprises a first transmitter frequency, and the resulting signal comprises effects corresponding to the first transmitter signal;
demodulate the resulting signal to produce first and second output signals; and
determine a first measurement of a change of capacitive coupling between the transmitter electrode and the receiver electrode based on the first output signal, and to determine positional information for an input object based on the first measurement.

13. The capacitive sensor device of claim 12, wherein a measure of interference is determined based on the second output signal, and the sensor module is configured to transmit a second transmitter signal, different from the first transmitter signal, based on the measure of interference.

14. The capacitive sensor device of claim 12, wherein the third mixing frequency is a combination of the first mixing frequency and the first transmitter frequency such that the third mixing frequency corresponds to the absolute value of the difference between the first mixing frequency and the first transmitter signal.

15. The capacitive sensor device of claim 12, wherein the processing system further comprises a first filter stage coupled to the first mixing stage and a second filter stage coupled to the second mixing stage.

16. The capacitive sensor device of claim 12, wherein:
the processing system further comprises a third mixing stage comprising a fifth mixing frequency and a sixth mixing frequency, wherein the fifth mixing frequency is in quadrature with third mixing frequency, and the sixth mixing frequency is in quadrature with the fourth mixing frequency;
the processing system is further configured to demodulate the resulting signal to produce a first quadrature signal and a second quadrature signal, wherein the first quadrature signal is in quadrature with the first output signal, and the second quadrature signal is in quadrature with the second output signal; and
the processing system is further configured to determine interference of the first quadrature signal and interference of the second quadrature signal.

17. A method of capacitive sensing, the method comprising:
transmitting a first transmitter signal with a transmitter electrode, the first transmitter signal comprising a first transmitter frequency;
receiving a resulting signal with a receiver electrode, the resulting signal comprising effects corresponding to the first transmitter signal;
demodulating the resulting signal to produce a first output signal and a second output signal by mixing the resulting signal with a first mixing stage and a second mixing stage in series with the first mixing stage, wherein the first mixing stage comprises a first mixing frequency and a second mixing frequency and the second mixing stage comprises a third mixing frequency and a fourth mixing frequency, and wherein the third mixing frequency corresponds to the absolute value of the difference between the first mixing frequency and the first transmitter frequency;

determining a first measurement of a change of capacitive coupling between the transmitter electrode and the receiver electrode based on the first output signal; and determining positional information for an input object based on the first measurement.

18. The method of claim 17, further comprising:

determining a measure of interference based on the second output signal, and transmitting a second transmitter signal, different from the first transmitter signal, based on the measure of interference.

19. The method of claim 17, further comprising:

demodulating the resulting signal to produce a first quadrature signal and a second quadrature signal, wherein the first quadrature signal is in quadrature with the first output signal, and the second quadrature signal is in quadrature with the second output signal; and determining interference of the first quadrature signal and interference of the second quadrature signal.

20. The method of claim 19, further comprising transmitting a second transmitter signal, different from the first transmitter signal, based on at least one of the interference of the first quadrature signal and the interference of the second quadrature signal.

* * * * *